US012803433B2

(12) United States Patent
Umeda

(10) Patent No.: US 12,803,433 B2
(45) Date of Patent: Nov. 17, 2026

(54) OPTIONAL FLOATING BUCK REGULATOR FOR LIQUID EJECTION APPARATUS

(71) Applicant: SEIKO EPSON CORPORATION, Tokyo (JP)

(72) Inventor: Atsushi Umeda, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 18/738,101

(22) Filed: Jun. 10, 2024

(65) Prior Publication Data

US 2024/0413754 A1 Dec. 12, 2024

(30) Foreign Application Priority Data

Jun. 12, 2023 (JP) ................................ 2023-096026

(51) Int. Cl.
*H02M 3/155* (2006.01)
*B41J 29/38* (2006.01)
*H02M 3/158* (2006.01)

(52) U.S. Cl.
CPC .............. *H02M 3/155* (2013.01); *B41J 29/38* (2013.01); *H02M 3/1586* (2021.05)

(58) Field of Classification Search
CPC .......................................... H02M 3/155–1588
See application file for complete search history.

(56) References Cited

U.S. PATENT DOCUMENTS

2009/0085536 A1* 4/2009 Qahouq .............. H02M 3/1584 323/272
2014/0340943 A1* 11/2014 Kotowski .......... H02M 1/4208 363/21.05
2016/0294282 A1* 10/2016 Herfurth ............. H05B 45/375

FOREIGN PATENT DOCUMENTS

JP 2004-284172 A 10/2004

* cited by examiner

*Primary Examiner* — Peter M Novak
(74) *Attorney, Agent, or Firm* — Spencer Fane LLP

(57) ABSTRACT

An optional unit for a liquid ejection apparatus includes a drive power output circuit that outputs a drive power signal supplied to a drive unit in which one end of a first capacitor, a cathode terminal of a diode, and one end of a inductor are coupled to a first node, the other end of the inductor and one end of a second capacitor are coupled to a second node, the other end of the second capacitor, an anode terminal of the diode, and one end of a switching element are coupled to a third node, the other end of the first capacitor and the other end of the switching element are coupled to a fourth node, the rectified voltage signal is supplied to the first node, and the drive unit has one end coupled to the second node and the other end coupled to the third node.

4 Claims, 4 Drawing Sheets

OPTIONAL FLOATING BUCK REGULATOR FOR LIQUID EJECTION APPARATUS

The present application is based on, and claims priority from JP Application Serial Number 2023-096026, filed Jun. 12, 2023, the disclosure of which is hereby incorporated by reference herein in its entirety.

BACKGROUND

1. Technical Field

The present disclosure relates to an optional unit for a liquid ejection apparatus.

2. Related Art

Recently, with an increase in size of a liquid ejection apparatus, a liquid ejection system as a configuration of a part of the liquid ejection apparatus, for example, a heater mechanism, a medium winding mechanism, an ink supply mechanism, and the like are independently formed from a main body of the liquid ejection apparatus, and are combined and used according to the application of the liquid ejection apparatus has been widely used.

For example, JP-A-2004-284172 discloses a configuration including an inkjet printer (liquid ejection apparatus) and a printing paper drying device as an accessory device which is provided independently of the inkjet printer and operates by being supplied with commercial power.

JP-A-2004-284172 is an example of the related art.

However, when the optional unit (accessory device) for a liquid ejection apparatus described in JP-A-2004-284172 is used in a region where a power supply environment including a voltage value of a commercial power supply is different, a change of the voltage value of the commercial power supply directly affects the load, and stability of the operation of the optional unit for a liquid ejection apparatus may be lower.

SUMMARY

An optional unit for a liquid ejection apparatus according to an aspect of the present disclosure is an optional unit for a liquid ejection apparatus attached to a liquid ejection apparatus for use. The optional unit for a liquid ejection apparatus includes a rectifier circuit to which a commercial power supply is input and which outputs a rectified voltage signal, a first drive power output circuit to which the rectified voltage signal is input and which outputs a first drive power signal, and a first drive unit which is driven by the first drive power signal. The first drive power output circuit includes a first capacitor, a second capacitor, a first inductor, a first diode, and a first switching element. One end of the first capacitor, a cathode terminal of the first diode, and one end of the first inductor are electrically coupled to a first node. The other end of the first inductor and one end of the second capacitor are electrically coupled to a second node. The other end of the second capacitor, an anode terminal of the first diode, and one end of the first switching element are electrically coupled to a third node. The other end of the first capacitor and the other end of the first switching element are electrically coupled to a fourth node. The rectified voltage signal is supplied to the first node. The first drive unit has one end electrically coupled to the second node and the other end electrically coupled to the third node.

DESCRIPTION OF EMBODIMENTS

As below, preferred embodiments of the present disclosure will be described with reference to the drawings. The drawings to be used are for convenience of explanation. Note that the embodiments to be described below do not unduly limit the present disclosure described in the claims. In addition, not all configurations to be described below are necessarily essential components of the present disclosure.

1. First Embodiment

1.1 Configuration of Liquid Ejection System

Figure 1:
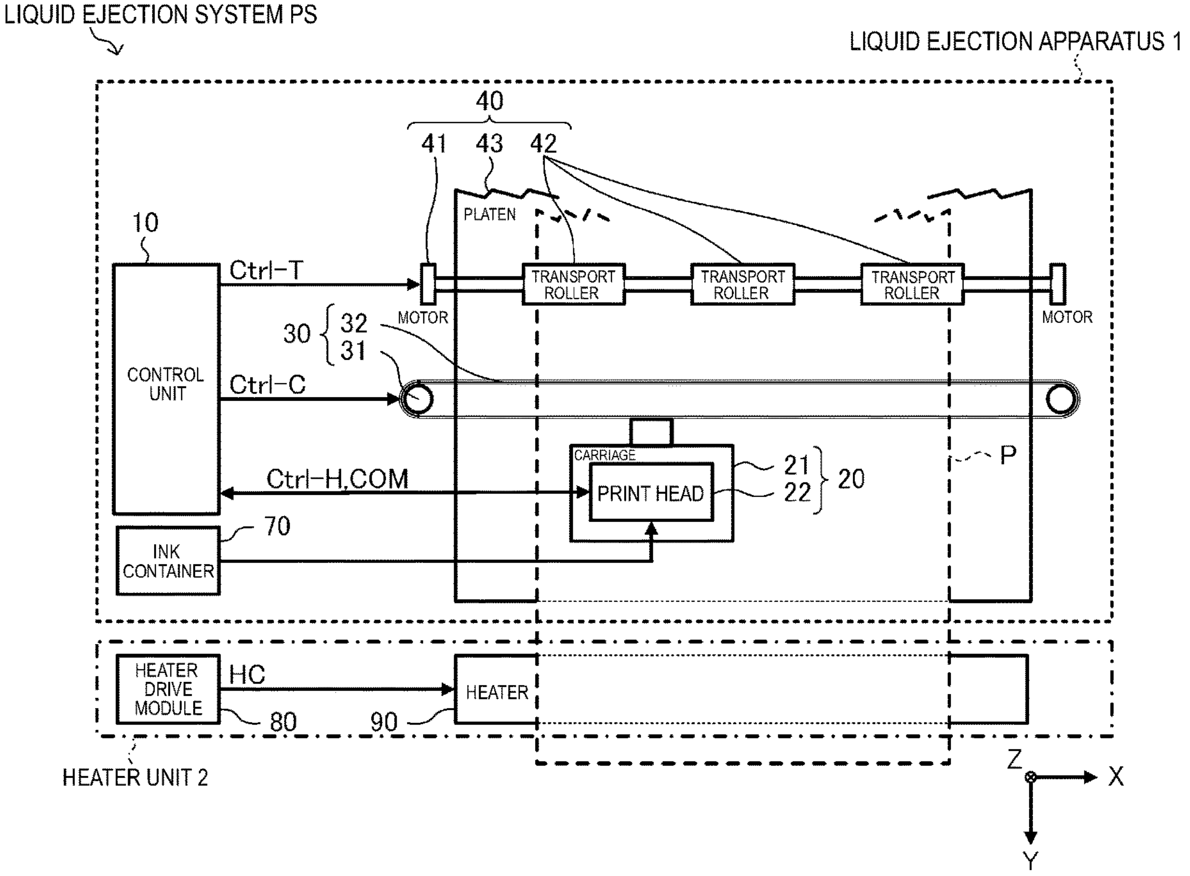
FIG. 1 shows a schematic configuration of a liquid ejection system.

FIG. 1 shows a schematic configuration of a liquid ejection system PS. The liquid ejection system PS of the embodiment includes a liquid ejection apparatus forming a desired image by ejecting an ink onto a medium P, and a heater unit 2 as an optional unit for a liquid ejection apparatus attached to the liquid ejection apparatus 1 and drying the ink ejected onto the medium by the liquid ejection apparatus 1. Here, in FIG. 1, the explanation will be made using an X-axis, a Y-axis, and a Z-axis which are three spatial axes orthogonal to one another. In the following description, when the directions along the X-axis, the Y-axis, and the Z-axis are specified, the pointer side of the arrow indicating the direction along the X-axis shown in the drawing may be referred to as "+X side", the tail side may be referred to as "−X side", the pointer side of the arrow indicating the direction along the Y-axis shown in the drawing may be referred to as "+Y side", the tail side may be referred to as "−Y side", the pointer side of the arrow indicating the direction along the Z-axis shown in the drawing may be referred to as "+Z side", and the tail side may be referred to as "−Z side".

The liquid ejection apparatus 1 shown in the embodiment will be described as a so-called serial printing-type inkjet printer in which a carriage 21 on which a print head 22 is mounted reciprocates along the X-axis, and the print head 22 ejects an ink to the medium P transported along the Y-axis to form a desired image on the medium P. The liquid ejection apparatus 1 provided in the liquid ejection system PS is not limited to the serial printing-type inkjet printer, but may be a line printing-type inkjet printer. Further, the liquid ejection apparatus 1 is not limited to the inkjet printer, but may be a color material ejection apparatus used for manufacture of a color filter for a liquid crystal display, an electrode material ejection apparatus used for formation of electrodes for an organic EL display or an FED (field emission display), a bioorganic material ejection apparatus used for manufacture of a biochip, a three-dimensional modeling apparatus for production of a three-dimensional object, a textile printing apparatus for dyeing a cloth, or the like.

The optional unit for a liquid ejection apparatus according to the embodiment described with the heater unit 2 as an example is an optional unit that can be selectively added to the liquid ejection apparatus 1 according to needs of a user who uses the liquid ejection apparatus 1. The optional unit for a liquid ejection apparatus is not limited to a configuration added to the liquid ejection apparatus 1 by a user, but includes a configuration added by a manufacturer or the like of the liquid ejection apparatus 1 before shipment at the time of manufacturing the liquid ejection apparatus 1 or the like. That is, the optional unit for a liquid ejection apparatus attached to the liquid ejection apparatus 1 is not limited to the configuration attached to the outside of the liquid ejection apparatus 1, but includes a configuration incorporated in the same housing as the liquid ejection apparatus 1. The optional unit for a liquid ejection apparatus is not limited to the heater unit 2, but may be, for example, a light source that radiates ultraviolet light for curing the ink ejected to the medium P.

The liquid ejection apparatus 1 includes a control unit 10, a head unit 20, a movement unit 30, a transport unit 40, and an ink container 70.

The ink container 70 stores a plurality of types of inks to be ejected onto the medium P. As the ink container 70 storing the inks, an ink cartridge, a bag-shaped ink pack formed of a flexible film, an ink tank in which the inks can be replenished, or the like may be used.

The control unit 10 includes a processing circuit such as a CPU (central processing unit) or an FPGA (field programmable gate array) and a memory circuit such as a semiconductor memory, and controls the respective elements of the liquid ejection apparatus 1 including the head unit 20.

The head unit 20 includes the carriage 21 and the print head 22. The carriage 21 is fixed to an endless belt 32 provided in the movement unit 30 to be described later. The print head 22 is mounted on the carriage 21. A control signal Ctrl-H and a head drive signal COM are input to the print head 22. The ink stored in the ink container 70 is supplied to the print head 22 through a tube (not shown) or the like. The print head 22 ejects the ink supplied from the ink container 70 from the −Z side to the +Z side along the Z-axis based on the input control signal Ctrl-H and head drive signal COM.

The movement unit 30 includes a carriage motor 31 and the endless belt 32. The carriage motor 31 operates to rotate forward and backward based on a control signal Ctrl-C input from the control unit 10. The endless belt 32 extends along the X-axis and rotates according to the operation of the carriage motor 31. The carriage motor 31 operates under control of the control unit 10, and the carriage 21 fixed to the endless belt 32 reciprocates along the X-axis. That is, the movement unit 30 reciprocates the print head 22 mounted on the carriage 21 along the X-axis.

The transport unit 40 includes a transport motor 41, a transport roller 42, and a platen 43. The transport motor 41 operates based on a control signal Ctrl-T input from the control unit 10. The transport roller 42 nips the medium P and rotates according to the operation of the transport motor 41. The platen 43 supports the medium P. The transport motor 41 is driven under control of the control unit 10, and thereby, the medium P nipped by the transport roller 42 is supported by the platen 43 and transported from the −Y side to the +Y side along the Y-axis. That is, the transport unit 40 transports the medium P from the −Y side to the +Y side along the Y-axis.

The heater unit 2 is located downstream of the print head 22 in the transport direction of the medium P transported along the transport unit 40. That is, the heater unit 2 is located at the +Y side of the print head 22. The heater unit 2 generates heat to dry the ink landed on the medium P and fix the ink to the medium P.

The heater unit 2 includes a heater drive module 80 and a heater 90. The heater drive module 80 outputs a heater drive signal HC for driving the heater 90. The heater 90 is driven based on the heater drive signal HC input from the heater drive module 80 to generate heat. The medium P is heated by the heat generation of the heater 90. Thereby, the medium P and the ink landed on the medium P are dried. As a result, the fixability of the ink landed on the medium P is increased.

In the liquid ejection system PS having the above described configuration, under control of the control unit 10 provided in the liquid ejection apparatus 1, the movement unit 30 controls the reciprocating movement of the carriage 21 along the scanning direction, the transport unit 40 controls the transport of the medium P in the direction along the transport direction, and the print head 22 mounted on the carriage 21 in the head unit 20 ejects the ink onto the medium P. Accordingly, the ink ejected by the print head 22 lands on a certain surface of the medium P, and a desired image is formed on the medium P. Then, the heater unit 2 dries the medium P and the ink landed on the medium P, and thereby, the fixability of the ink landed on the medium P is increased. Accordingly, the image quality output by the liquid ejection system PS is increased.

1.2 Functional Configuration of Liquid Ejection System

Figure 2:
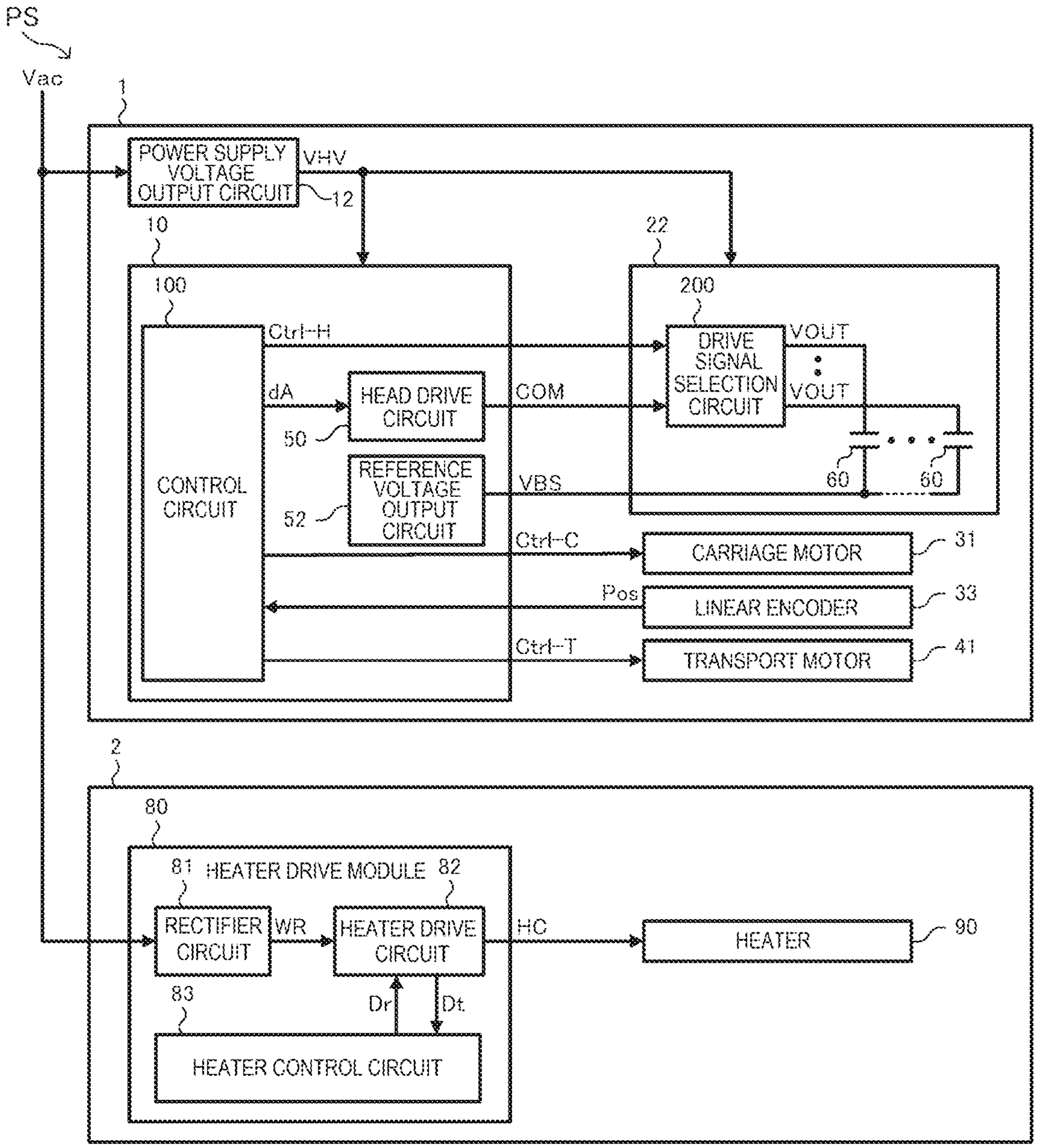
FIG. 2 shows an example of a functional configuration of the liquid ejection system.

Next, a functional configuration of the liquid ejection system PS will be described. FIG. 2 shows an example of the functional configuration of the liquid ejection system PS. As shown in FIG. 2, the liquid ejection system PS includes the liquid ejection apparatus 1 and the heater unit 2.

The liquid ejection apparatus 1 includes the control unit 10, a power supply voltage output circuit 12, the print head 22, the carriage motor 31, a linear encoder 33, and the transport motor 41.

The power supply voltage output circuit 12 generates a voltage signal VHV of a direct-current voltage used in the liquid ejection apparatus 1 from a voltage signal Vac as a commercial power supplied to the liquid ejection system PS. The power supply voltage output circuit 12 outputs the generated voltage signal VHV to various configurations of the liquid ejection apparatus 1. The power supply voltage output circuit 12 includes, for example, an existing AC/DC converter such as a flyback converter. Here, the power supply voltage output circuit 12 may output the voltage signals VHV having a plurality of voltage values corresponding to the respective configurations to be supplied with the voltage signals VHV. In this case, the power supply voltage output circuit 12 may include, in addition to an existing AC/DC converter such as a flyback converter, one or more DC/DC converters that convert the voltage value of the direct-current voltage output from the AC/DC converter according to the configuration to be supplied.

The control unit 10 includes a head drive circuit 50, a reference voltage output circuit 52, and a control circuit 100. The control circuit 100 includes, for example, a processing circuit such as a CPU or an FPGA and a memory circuit such as a semiconductor memory. An image information signal containing image data and the like is input to the control circuit 100 from an external apparatus such as a host computer externally and communicably connected to the liquid ejection apparatus 1. The control circuit 100 generates various signals for controlling the liquid ejection apparatus 1 based on the input image information signal, and outputs the signals to the corresponding configurations.

Specifically, the control circuit 100 acquires a position information signal Pos based on the scanning position of the carriage 21 output by the linear encoder 33 in addition to the image information signal described above. Accordingly, the control circuit 100 grasps the scanning position of the carriage 21 as the scanning position of the print head 22 mounted on the carriage 21. The control circuit 100 generates various signals according to the image information signal input from the external apparatus and the scanning position of the print head 22, and outputs the signals to the corresponding configurations.

Specifically, the control circuit 100 generates the control signal Ctrl-C for controlling the reciprocating movement along the scanning axis of the carriage 21 with the print head 22 mounted thereon according to the acquired scanning position of the print head 22, and outputs the control signal to the carriage motor 31. Thereby, the carriage motor 31 operates to control the scanning position and the movement of the print head 22 along the scanning axis. Further, the control circuit 100 generates the control signal Ctrl-T for controlling the transport of the medium P, and outputs the control signal to the transport motor 41. Thereby, the transport motor 41 operates to control the movement of the medium P along the transport direction. Note that the control signal Ctrl-C may be converted through a driver circuit (not shown) and then input to the carriage motor 31, and the control signal Ctrl-T may be converted through a driver circuit (not shown) and then input to the transport motor 41.

The control circuit 100 generates the control signal Ctrl-H for controlling ejection of the ink from the print head 22 based on the image information signal input from an external apparatus and the scanning position of the print head 22, and outputs the control signal to the print head 22.

Furthermore, the control circuit 100 outputs a base drive signal dA as a digital signal to the head drive circuit 50. The head drive circuit 50 generates the head drive signal COM having a signal waveform defined by the base drive signal dA, and outputs the head drive signal to the print head 22. Specifically, the head drive circuit 50 performs digital-analog signal conversion on the digital base drive signal dA input from the control circuit 100, and then, generates the head drive signal COM by performing class D amplification on the converted analog signal, and outputs the head drive signal to the print head 22. Here, the base drive signal dA may be an analog signal as long as the signal may define the signal waveform of the head drive signal COM. The head drive circuit 50 may also generate the head drive signal COM by class A amplification, class B amplification, or class AB amplification of the signal waveform defined by the base drive signal dA.

The reference voltage output circuit 52 generates a reference voltage signal VBS and outputs the signal to the print head 22. The reference voltage signal VBS is a signal at a constant potential as a reference for driving of a piezoelectric element 60 provided in the print head 22, which will be described later, and is a direct-current voltage signal at a constant potential of the ground potential, 5.5 V, 6 V, or the like.

The print head 22 includes a drive signal selection circuit 200 and a plurality of the piezoelectric elements 60. The control signal Ctrl-H and the head drive signal COM are input to the drive signal selection circuit 200. The drive signal selection circuit 200 selects or deselects the signal waveform contained in the head drive signal COM based on the input control signal Ctrl-H, and thereby, generates a drive signal VOUT corresponding to each of the plurality of piezoelectric elements 60. Then, the drive signal selection circuit 200 outputs the generated drive signal VOUT to one end of each of the corresponding piezoelectric elements 60. The reference voltage signal VBS output by the reference voltage output circuit 52 is commonly input to the other ends of the plurality of piezoelectric elements 60. Each of the plurality of piezoelectric elements 60 is displaced by the potential difference between the drive signal VOUT input to the one end and the reference voltage signal VBS input to the other end. The print head 22 ejects an amount of ink corresponding to the displacement amount generated in the piezoelectric element 60 from a nozzle.

As described above, the liquid ejection apparatus 1 operates using the voltage signal Vac, which is a commercial power supply, as a drive source, and the print head 22 ejects the ink to a desired position on the medium P according to the image data input from an external apparatus. Thereby, the liquid ejection apparatus 1 forms a desired image on the medium P.

The heater unit 2 of the liquid ejection system PS includes the heater drive module 80 and a heater 90. The voltage signal Vac as the commercial power supply is input to the heater drive module 80 and the module outputs the heater drive signal HC. The heater 90 generates heat according to the heater drive signal HC.

The heater drive module 80 includes a rectifier circuit 81, a heater drive circuit 82, and a heater control circuit 83.

The voltage signal Vac as the commercial power supply is input to the rectifier circuit 81. The rectifier circuit 81 outputs a rectified voltage signal WR obtained by full-wave rectification of the input voltage signal Vac to the heater drive circuit 82. The rectified voltage signal WR output by the rectifier circuit 81 is not limited to the signal obtained by full-wave rectification of the voltage signal Vac, but may be a signal obtained by half-wave rectification of the voltage signal Vac.

The heater control circuit 83 acquires a state detection signal Dt indicating a drive state of the heater drive circuit 82 from the heater drive circuit 82. Then, the heater control circuit 83 generates a drive control signal Dr corresponding to the acquired state detection signal Dt, and outputs the drive control signal to the heater drive circuit 82.

The heater drive circuit 82 generates a signal in which the voltage value of the rectified voltage signal WR is controlled by controlling the voltage value of the rectified voltage signal WR input from the rectifier circuit 81 based on the drive control signal Dr input from the heater control circuit 83. The heater drive circuit 82 outputs the signal obtained by controlling the voltage value of the generated rectified voltage signal WR as the heater drive signal HC to the heater 90.

The heater 90 generates heat according to the input heater drive signal HC. As the heater 90, a resistance load such as a nichrome wire can be used as a heating element. The heater 90 generates heat based on a current generated according to the voltage value of the input heater drive signal HC. The heat generated by the heater 90 is transmitted to the medium P, and thereby, the ink landed on the medium P is dried.

As described above, the heater unit 2 of the embodiment is the optional unit for a liquid ejection apparatus attached to the liquid ejection apparatus 1 for use, including the rectifier circuit 81 to which the voltage signal Vac as the commercial power supply is input and which outputs the rectified voltage signal WR, the heater drive circuit 82 to which the rectified voltage signal WR is input and which outputs the heater drive signal HC, and the heater 90 which is driven by the heater drive signal HC and generates heat. The heater unit 2 dries the ink ejected onto the medium P by the liquid ejection apparatus 1, thereby improving the image quality formed on the medium P.

1.3 Configuration and Operation of Heater Drive Module

Figure 3:
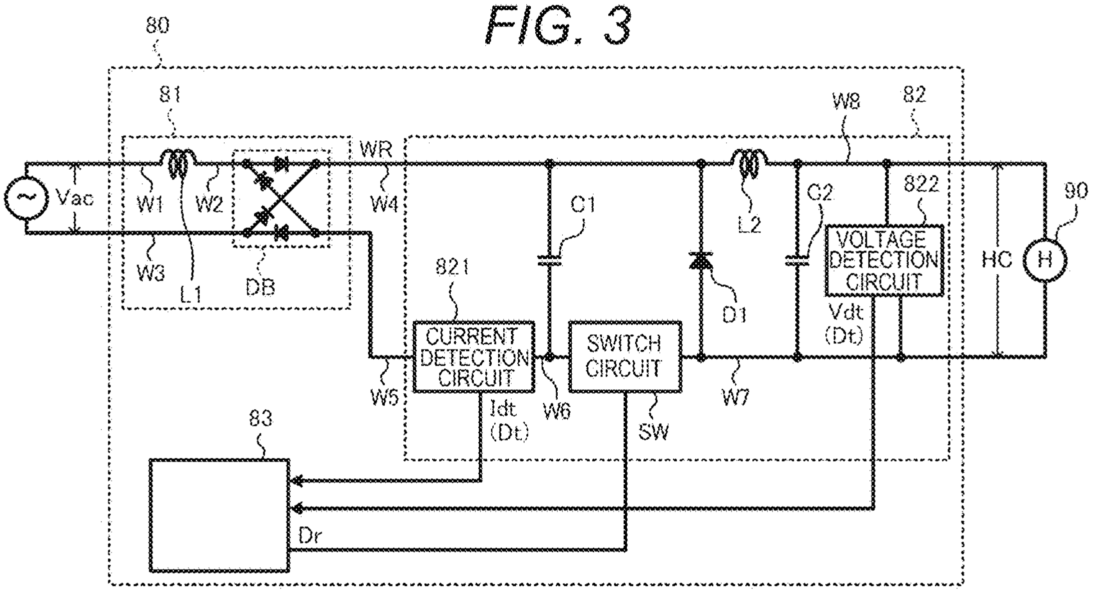
FIG. 3 shows a configuration of a heater drive module.

Next, the configuration and the operation of the heater drive module 80 that drives the heater 90 will be described. FIG. 3 shows the configuration of the heater drive module 80. As described above, the heater drive module 80 includes the rectifier circuit 81, the heater drive circuit 82, and the heater control circuit 83.

The rectifier circuit 81 includes an inductor L1 and a diode bridge DB. One end of the inductor L1 is electrically coupled to a wire W1, and the other end is electrically coupled to a wire W2. The diode bridge DB has one input end electrically coupled to the wire W2, the other input end electrically coupled to a wire W3, a positive-side output end electrically coupled to a wire W4, and a negative-side output end electrically coupled to a wire W5. The voltage signal Vac supplied between the wire W1 and the wire W2 is input to the rectifier circuit 81.

In the rectifier circuit 81 having the above described configuration, the inductor L1 reduces normal mode noise superimposed on the voltage signal Vac supplied between the wire W1 and the wire W2, and the diode bridge DB performs full-wave rectification on the noise-reduced voltage signal Vac. The rectifier circuit 81 outputs a signal obtained by full-wave rectification of the voltage signal Vac by the diode bridge DB as the rectified voltage signal WR.

Here, the rectifier circuit 81 may include an inductor element such as a line filter that reduces common mode noise superimposed on the voltage signal Vac, instead of the inductor L1 or in addition to the inductor L1. The rectifier circuit 81 may include a diode element that performs half-wave rectification on the voltage signal Vac instead of the diode bridge DB. In this case, the rectifier circuit 81 may output a signal obtained by half-wave rectification of the voltage signal Vac as the rectified voltage signal WR.

The heater drive circuit 82 includes capacitors C1 and C2, a diode D1, an inductor L2, and a switch circuit SW.

The capacitor C1 has one end electrically coupled to the wire W4 and the other end electrically coupled to a wire W6. The diode D1 has a cathode terminal electrically coupled to the wire W4 and an anode terminal electrically coupled to a wire W7. The inductor L2 has one end electrically coupled to the wire W4 and the other end electrically coupled to a wire W8. The capacitor C2 has one end electrically coupled to the wire W8 and the other end electrically coupled to the wire W7. The switch circuit SW has one end electrically coupled to the wire W7 and the other end electrically coupled to the wire W6. The drive control signal Dr output by the heater control circuit 83 is input to a control terminal of the switch circuit SW.

In other words, the one end of the capacitor C1, the cathode terminal of the diode D1, and the one end of the inductor L2 are electrically coupled to the wire W4, the other end of the capacitor C1 and the other end of the switch circuit SW are electrically coupled to the wire W6, the anode terminal of the diode D1, the one end of the capacitor C2, and the one end of the switch circuit SW are electrically coupled to the wire W7, and the other end of the inductor L2 and the one end of the capacitor C2 are electrically coupled to the wire W8. The wire W8 is electrically coupled to one end of the heater 90, and the wire W7 is electrically coupled to the other end of the heater 90. That is, the heater drive circuit 82 outputs a voltage generated between the wire W8 and the wire W7 as the heater drive signal HC.

In the heater drive circuit 82 having the above described configuration, the capacitor C1 functions as a filter circuit that reduces noise of the rectified voltage signal WR input to the wire W4. The capacitance of the capacitor C1 is capacitance that has a small influence on the full-wave-rectified signal waveform contained in the rectified voltage signal WR and can reduce the noise superimposed on the rectified voltage signal WR, and is 5 μF or less, preferably about 1 μF. Accordingly, the chance that the power factor of the liquid ejection system PS becomes lower due to the influence of the heater drive module 80 may be reduced and the influence of the noise superimposed on the rectified voltage signal WR may be reduced. Further, the capacitance of the capacitor C1 is set to capacitance of 5 μF or less, about 1 μF, and thereby, a film capacitor or a chip capacitor having a smaller component size than an electrolytic capacitor can be selected as the capacitor C1. Accordingly, the heater drive circuit 82 can be downsized.

The continuity between the one end and the other end of the switch circuit SW is controlled according to the logic level of the drive control signal Dr input to the control terminal. Specifically, when the logic level of the drive control signal Dr input to the control terminal is a high level, the switch circuit SW controls the continuity between the one end and the other end, and when the logic level of the drive control signal Dr input to the control terminal is a low level, controls discontinuity between the one end and the other end. That is, the switch circuit SW performs a switching operation according to the drive control signal Dr.

In the following description, a state in which the one end and the other end of the switch circuit SW are controlled to be continuous may be referred to as an ON state, and a state in which the one end and the other end of the switch circuit SW are controlled to be discontinuous may be referred to as an OFF state. When the logic level of the drive control signal Dr input to the control terminal is the high level, the switch circuit SW may control the one end and the other end to be discontinuous, and when the logic level of the drive control signal Dr input to the control terminal is the low level, may control the one end and the other end to be continuous.

The switch circuit SW executes the switching operation, and thereby, the supply of a current that accompanies the propagation of the heater drive signal HC and accompanies the propagation of the rectified voltage signal WR to the heater 90 is controlled. Specifically, when the switch circuit SW is in the ON state, the current that accompanies the propagation of the heater drive signal HC and accompanies the propagation of the rectified voltage signal WR is fed back to the rectifier circuit 81 via the switch circuit SW. Accordingly, the current that accompanies the propagation of the heater drive signal HC and accompanies the propagation of the rectified voltage signal WR is supplied to the heater 90. On the other hand, when the switch circuit SW is in the OFF state, the current that accompanies the propagation of the heater drive signal HC and accompanies the propagation of the rectified voltage signal WR is interrupted by the switch circuit SW. Accordingly, the current that accompanies the propagation of the heater drive signal HC and accompanies the propagation of the rectified voltage signal WR is not supplied to the heater 90.

The inductor L2 and the capacitor C2 form a low-pass filter. The low-pass filter including the inductor L2 and the capacitor C2 smooths the amplitude of the signal generated by the switching operation of the switch circuit SW. The cutoff frequency of the low-pass filter including the inductor L2 and the capacitor C2 is preferably a frequency larger than twice the frequency of the voltage signal Vac as the commercial power supply and smaller than the switching frequency of the switch circuit SW, and is set to be about several kilohertz to 10 kilohertz in the embodiment.

The diode D1 forms a feedback path for feeding back the electric charge stored in the inductor L2 to the wire W4 when the switch circuit SW is controlled to be in the OFF state. Accordingly, when the switch circuit SW is controlled to be in the OFF state, the chance that the signal waveform of the heater drive signal HC is distorted due to the electric charge stored in the inductor L2 is reduced.

The heater drive circuit 82 includes a current detection circuit 821 and a voltage detection circuit 822.

The current detection circuit 821 has one end electrically coupled to the wire W6 and the other end electrically coupled to the wire W5. The current detection circuit 821 detects a current value of the current that accompanies the propagation of the heater drive signal HC and accompanies the propagation of the rectified voltage signal WR. The current detection circuit 821 generates a current detection signal Idt corresponding to the detected current value, and outputs the signal to the heater control circuit 83 as the state detection signal Dt. As the current detection circuit 821, a resistance element having a sufficiently small resistance value with respect to the resistance value of the heater 90 can be used. The current detection circuit 821 may include one or more semiconductor elements instead of or in addition to the resistance element.

The voltage detection circuit 822 has one end electrically coupled to the wire W8 and the other end electrically coupled to the wire W7. The voltage detection circuit 822 detects a voltage value of the heater drive signal HC supplied to the heater 90. The voltage detection circuit 822 generates a voltage detection signal Vdt corresponding to the detected voltage value, and outputs the signal as the state detection signal Dt to the heater control circuit 83. The voltage detection circuit 822 may be formed using a plurality of resistance elements configured to have sufficiently large resistance values with respect to the resistance value of the heater 90. The voltage detection circuit 822 may include one or more semiconductor elements instead of or in addition to the plurality of resistance elements.

The heater control circuit 83 generates a drive control signal Dr based on the current detection signal Idt input from the current detection circuit 821 and the voltage detection signal Vdt input from the voltage detection circuit 822, and outputs the drive control signal to the switch circuit SW. The heater control circuit 83 includes, for example, a microcomputer or an FPGA.

An example of the operation of the heater drive module 80 having the above described configuration will be described. The heater drive module 80 of the embodiment controls the voltage value of the heater drive signal HC by the switching operation of the switch circuit SW. Accordingly, the amount of the current supplied to the heater 90 is controlled with the propagation of the heater drive signal HC. Here, the switching operation of the switch circuit SW that controls the voltage value of the heater drive signal HC is controlled by the drive control signal Dr output by the heater control circuit 83. For the description of the example of the operation of the heater drive module 80, first, a specific example of the configuration of the switch circuit SW and an example of the signal waveform of the drive control signal Dr output by the heater control circuit 83 will be described.

Figure 4:
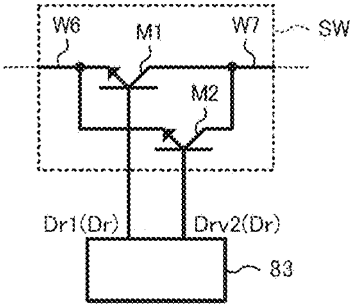
FIG. 4 shows an example of a configuration of a switch circuit.

FIG. 4 shows an example of the configuration of the switch circuit SW. As shown in FIG. 4, the switch circuit SW includes a transistor M1 and a transistor M2. The transistor M1 has a collector terminal electrically coupled to the wire W7, and an emitter terminal electrically coupled to the wire W6. A drive control signal Dr1 of the drive control signals Dr output by the heater control circuit 83 is input to a base terminal of the transistor M1. The transistor M2 has a collector terminal electrically coupled to the wire W7, and an emitter terminal electrically coupled to the wire W6. A drive control signal Dr2 of the drive control signals Dr output by the heater control circuit 83 is input to a base terminal of the transistor M2.

That is, the transistor M1 and the transistor M2 are coupled in parallel in the switch circuit SW. When the drive control signal Dr1 input to the base terminal is at a high level, the transistor M1 controls the collector terminal and the emitter terminal to be continuous, and when the drive control signal Dr1 input to the base terminal is at a low level, controls the collector terminal and the emitter terminal to be discontinuous. When the drive control signal Dr2 input to the base terminal is at a high level, the transistor M2 controls the collector terminal and the emitter terminal to be continuous, and when the drive control signal Dr2 input to the base terminal is at a low level, controls the collector terminal and the emitter terminal to be discontinuous. That is, the transistor M1 performs a switching operation according to the drive control signal Dr1, and the transistor M2 performs a switching operation according to the drive control signal Dr2. The number of transistors contained in the switch circuit SW is not limited to two.

Here, in the following description, a state in which the collector terminal and the emitter terminal of the transistor M1 are controlled to be continuous may be referred to as an ON state of the transistor M1, and a state in which the collector terminal and the emitter terminal of the transistor M1 are controlled to be discontinuous may be referred to as an OFF state of the transistor M1. Similarly, a state in which the collector terminal and the emitter terminal of the transistor M2 are controlled to be continuous may be referred to as an ON state of the transistor M2, and a state in which the collector terminal and the emitter terminal of the transistor M2 are controlled to be discontinuous may be referred to as an OFF state of the transistor M2.

As described above, the switch circuit SW of the embodiment includes the transistors M1 and M2, and controls the supply of the current that accompanies the propagation of the heater drive signal HC and accompanies the propagation of the rectified voltage signal WR to the heater 90 by the switching operations of the transistors M1 and M2. Next, an example of the signal waveforms of the drive control signals Dr output by the heater control circuit 83 as examples of the drive control signal Dr1 input to the transistor M1 and the drive control signal Dr2 input to the transistor M2 will be described.

Figure 5:
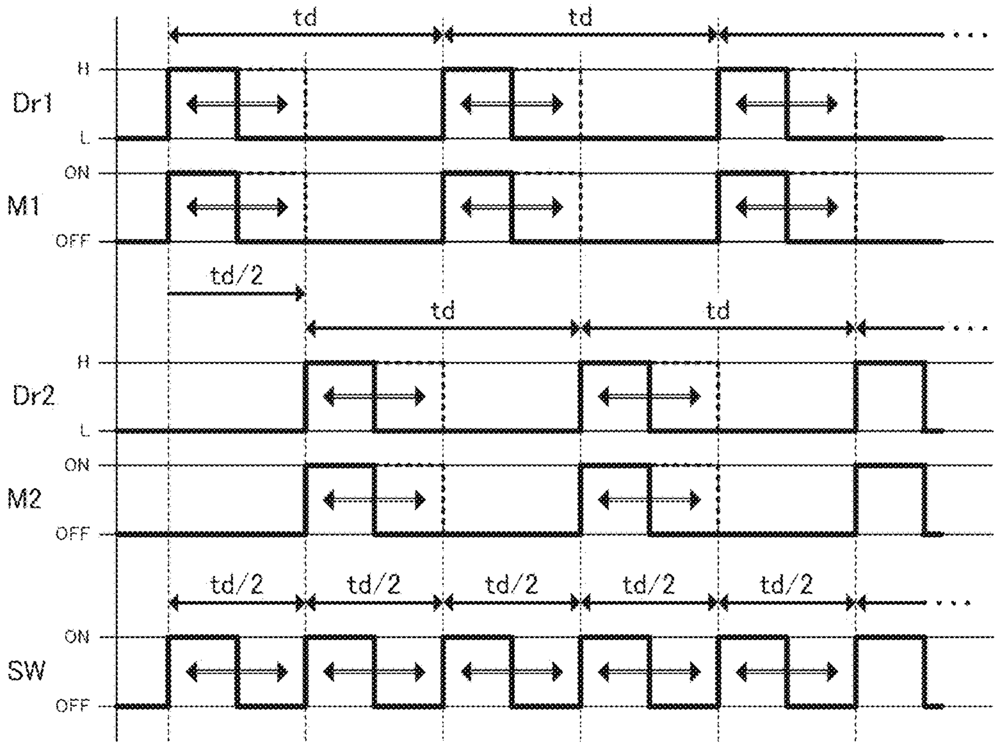
FIG. 5 shows examples of a drive control signal Dr1 and a drive control signal Dr2.

FIG. 5 shows the examples of the drive control signal Dr1 and the drive control signal Dr2. As shown in FIG. 5, the heater control circuit 83 outputs, as the drive control signal Dr1, a pulse signal that is at a high level for a certain period of time with respect to each period td, and outputs, as the drive control signal Dr2, a pulse signal that is delayed from the drive control signal Dr1 by a period td/2 and is at a high level for a certain period of time with respect to each period td. That is, the heater control circuit 83 outputs the drive control signal Dr1 as the pulse signal and the drive control signal Dr2 as the pulse signal whose phase is shifted by 180 degrees with respect to the drive control signal Dr1.

Further, the heater control circuit 83 controls ON-Duty of the drive control signal Dr1 from 0% to 50% and controls ON-Duty of the drive control signal Dr2 from 0% to 50% based on at least one of the current detection signal Idt and the voltage detection signal Vdt. That is, the heater control circuit 83 outputs the drive control signals Dr1 and Dr2 that can be at the high level during the period td/2 from the rise of the pulse signal. As described above, the drive control signal Dr2 is the pulse signal whose phase is shifted by 180 degrees with respect to the drive control signal Dr1. Therefore, as shown in FIG. 5, the heater control circuit 83 outputs the low-level drive control signal Dr2 in a period in which the high-level drive control signal Dr1 can be output, and outputs the low-level drive control signal Dr1 in a period in which the high-level drive control signal Dr2 can be output. That is, the heater control circuit 83 controls the transistor M2 to be in the OFF state in a period in which the transistor M1 can be controlled to be in the ON state, and controls the transistor M1 to be in the OFF state in a period in which the transistor M2 can be controlled to be in the ON state. In other words, the heater control circuit 83 performs control such that the transistor M1 and the transistor M2 are not simultaneously turned on.

The switch circuit SW having the above described configuration is controlled to be in the ON state when at least one of the transistor M1 and the transistor M2 is controlled to be in the ON state, and is controlled to be in the OFF state when the transistor M1 and the transistor M2 are controlled to be in the OFF state. Therefore, the switch circuit SW of the embodiment is controlled in the ON state or the OFF state according to the logic level of the drive control signal Dr1 in the period in which the heater control circuit 83 can output the high-level drive control signal Dr1, and is controlled in the ON state or the OFF state according to the logic level of the drive control signal Dr2 in the period in which the heater control circuit 83 can output the high-level drive control signal Dr2. As a result, the switch circuit SW of the embodiment operates at a frequency equal to the sum of the frequency of the drive control signal Dr1 input to the transistor M1 and the frequency of the drive control signal Dr2 input to the transistor M2. Here, the Duty at which the switch circuit SW is controlled to be in the ON state changes from 0% to 100%.

In the heater drive circuit 82 including the switch circuit SW having the above described configuration, the switching frequencies of the respective transistor M1 and transistor M2 may be reduced. Accordingly, switching losses occurring in the transistor M1 and the transistor M2 may be reduced. Further, in the heater drive circuit 82 including the switch circuit SW having the above described configuration, even when the switching frequencies of the respective transistor M1 and transistor M2 are reduced, the operating frequency of the switch circuit SW may be increased in a pseudo manner. Accordingly, the accuracy of the voltage value of the heater drive signal HC is increased, and as a result, the accuracy of the current that accompanies the propagation of the heater drive signal HC supplied to the heater 90 is increased. Therefore, the accuracy of the control of the temperature of the heater 90 is increased. Furthermore, in the heater drive circuit 82 of the embodiment, since the operating frequency of the switch circuit SW may be increased in a pseudo manner, the inductor L2 can be downsized, and as a result, downsizing of the heater drive circuit 82 may be realized.

In the heater drive module 80 having the above described configuration, when the switch circuit SW is controlled to be in the ON state, the current that accompanies the propagation of the heater drive signal HC and accompanies the propagation of the rectified voltage signal WR is fed back to the rectifier circuit 81 via the switch circuit SW. As a result, the voltage value of the heater drive signal HC increases toward the voltage value of the rectified voltage signal WR. On the other hand, when the switch circuit SW is controlled to be in the OFF state, the current that accompanies the propagation of the heater drive signal HC and accompanies the propagation of the rectified voltage signal WR is interrupted by the switch circuit SW. As a result, the potential difference between the wire W8 and the wire W7 becomes smaller, and the voltage value of the heater drive signal HC decreases.

In the heater drive module 80 of the embodiment, the heater control circuit 83 compares the voltage value of the heater drive signal HC estimated based on the voltage detection signal Vdt input from the voltage detection circuit 822 with a voltage value of the heater drive signal HC as an output target by the heater drive module 80. Then, the heater control circuit 83 controls the ON-Duty of the drive control signal Dr to be output according to the result of the comparison between the voltage value of the heater drive signal HC estimated based on the voltage detection signal Vdt input from the voltage detection circuit 822 and the voltage value of the heater drive signal HC as the output target by the heater drive module 80. Thereby, the heater drive module 80 outputs the heater drive signal HC having a desired voltage value regardless of the voltage value of the input voltage signal Vac.

Specifically, when the voltage value of the heater drive signal HC estimated based on the voltage detection signal Vdt input to the heater control circuit 83 is smaller than the target voltage value of the heater drive signal HC, that is, when the voltage value of the heater drive signal HC input to the heater 90 is smaller than the target voltage value, the heater control circuit 83 increases the ON-Duty of the drive control signal Dr input to the switch circuit SW. Accordingly, the voltage value of the heater drive signal HC output by the heater drive module 80 increases toward the target voltage value.

On the other hand, when the voltage value of the heater drive signal HC estimated based on the voltage detection signal Vdt input to the heater control circuit 83 is larger than the target voltage value of the heater drive signal HC, that is, when the voltage value of the heater drive signal HC input to the heater 90 is larger than the target voltage value, the heater control circuit 83 decreases the ON-Duty of the drive control signal Dr input to the switch circuit SW. Accordingly, the voltage value of the heater drive signal HC output by the heater drive module 80 decreases toward the target voltage value.

Thereby, the heater drive module 80 outputs the heater drive signal HC having a desired voltage value regardless of the voltage value of the input voltage signal Vac. Therefore, even when the heater unit 2 is used in a region where the power supply environment including the voltage value of the commercial power supply is different, the chance that the change of the voltage value of the commercial power supply affects the heater 90 as the load is reduced, and as a result, the chance that the stability of the operation of the heater 90 as the optional unit for a liquid ejection apparatus becomes lower is reduced.

In the liquid ejection system PS having the above described configuration, the heater unit 2 is an example of an optional unit for a liquid ejection apparatus attached to the liquid ejection apparatus 1 for use, the voltage signal Vac is an example of a commercial power supply, the heater drive signal HC is an example of a first drive power signal, the heater drive circuit 82 is an example of a first drive power output unit, and the heater 90 is an example of a first drive unit. The capacitor C1 of the heater drive circuit 82 is an example of a first capacitor, the capacitor C2 is an example of a second capacitor, the inductor L2 is an example of a first inductor, the diode D1 is an example of a first diode, at least one of the switch circuit SW and the transistor M1 contained in the switch circuit SW is an example of a first switching element, and the transistor M2 contained in the switch circuit SW is an example of a second switching element. The wire W4 is an example of a first node, the wire W8 is an example of a second node, the wire W7 is an example of a third node, and the wire W6 is an example of a fourth node.

1.4 Functions and Effects

As described above, the heater unit 2 as an optional unit for a liquid ejection apparatus used in the liquid ejection system PS of the embodiment includes the rectifier circuit 81 to which the voltage signal Vac is input and which outputs the rectified voltage signal WR, the heater drive circuit 82 to which the rectified voltage signal WR is input and which outputs the heater drive signal HC, and the heater 90 which is driven by the heater drive signal HC, the heater drive circuit 82 has the capacitor C1, the capacitor C2, the inductor L2, the diode D1, and the transistor M1 contained in the switch circuit SW, the one end of the capacitor C1, the cathode terminal of the diode D1, and the one end of the inductor L2 are electrically coupled to the wire W4, the other end of the inductor L2 and the one end of the capacitor C2 are coupled to the wire W8, the other end of the capacitor C2, the anode terminal of the diode D1, and the collector terminal of the transistor M1 as the one end of the switch circuit SW are electrically coupled to the wire W7, and the other end of the capacitor C1 and the emitter terminal of the transistor M1 as the other end of the switch circuit SW are electrically coupled to the wire W6. The rectified voltage signal WR is supplied to the wire W4, and the heater 90 has the one end electrically coupled to the wire W8 and the other end electrically coupled to the wire W7.

In the heater drive circuit 82 having the configuration, the continuity between the collector terminal and the emitter terminal of the transistor M1 as the continuity between the one end and the other end of the switch circuit SW are controlled, and thereby, the heater drive signal HC of a constant voltage value may be output to the heater 90 regardless of the voltage value of the input voltage signal Vac. Accordingly, even when the heater unit 2 is used in a region where the power supply environment including the voltage value of the commercial power supply is different, the chance that the change of the voltage value of the commercial power supply affects the heater 90 as the load is reduced, and as a result, the chance that the stability of the operation of the heater 90 as the optional unit for a liquid ejection apparatus becomes lower is reduced.

In the heater unit 2 as the optional unit for a liquid ejection apparatus used in the liquid ejection system PS of the embodiment, the heater drive circuit 82 has the transistor M2, the collector terminal as the one end of the transistor M2 is electrically coupled to the wire W7, and the emitter terminal as the other end of the transistor M2 is electrically coupled to the wire W6. That is, the transistor M1 and the transistor M2 are coupled in parallel. Accordingly, the amounts of currents flowing through the transistor M1 and the transistor M2 may be reduced, and as a result, power losses in the transistor M1 and the transistor M2 may be reduced.

In the heater unit 2 as the optional unit for a liquid ejection apparatus used in the liquid ejection system PS of the embodiment, the collector terminal as the one end of the transistor M2 and the emitter terminal as the other end are controlled to be discontinuous in the period in which the collector terminal as the one end of the transistor M1 and the emitter terminal as the other end are controlled to be continuous, and the collector terminal as the one end of the transistor M1 and the emitter terminal as the other end are controlled to be discontinuous in the period in which the collector terminal as the one end of the transistor M2 and the emitter terminal as the other end are controlled to be continuous. That is, the transistor M1 and the transistor M2 are not simultaneously turned on. Accordingly, the pseudo switching frequency of the switch circuit SW including the transistor M1 and the transistor M2 may be increased, and as a result, the switching losses of the transistor M1 and the transistor M2 may be reduced.

2. Second Embodiment

Next, a liquid ejection system PS according to a second embodiment will be described. The liquid ejection system PS of the second embodiment is different from the liquid ejection system PS of the first embodiment in that the heater unit 2 includes a heater 90*a*, a heater 90*b*, a heater drive circuit 82*a* that outputs a heater drive signal HCa to the heater 90*a*, and a heater drive circuit 82*b* that outputs a heater drive signal HCb to the heater 90*b*. That is, in the liquid ejection system PS of the second embodiment, the heater unit 2 includes the rectifier circuit 81 to which the voltage signal Vac is input and which outputs the rectified voltage signal WR, the heater drive circuit 82*a* to which the rectified voltage signal WR is input and which outputs the heater drive signal HCa, the heater 90*a* which is driven by the heater drive circuit 82*a*, the heater drive circuit 82*b* to which the rectified voltage signal WR is input and which outputs the heater drive signal HCb, and the heater 90*b* which is driven by the heater drive circuit 82*b*. For description of the liquid ejection system PS of the second embodiment, the same configurations as those of the liquid ejection system PS of the first embodiment have the same signs and the description thereof will be simplified or omitted.

Figure 6:
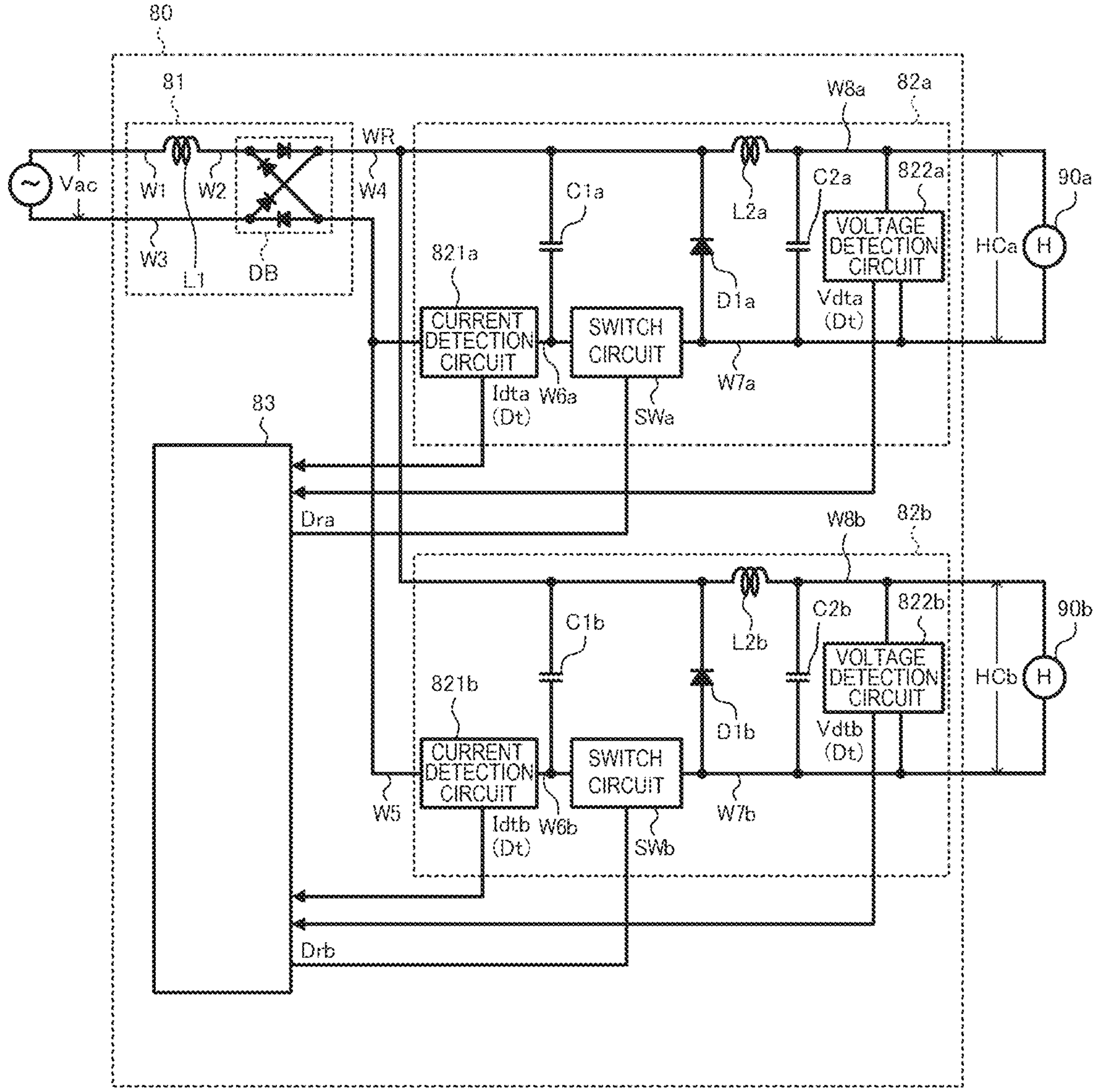
FIG. 6 shows an example of a configuration of a heater drive module of a heater unit of a liquid ejection system according to a second embodiment.

FIG. 6 shows an example of a configuration of the heater drive module 80 of the heater unit 2 provided in the liquid ejection system PS according to the second embodiment. The heater drive module 80 of the second embodiment includes the rectifier circuit 81, the heater drive circuits 82*a* and 82*b*, and the heater control circuit 83.

Similarly to the first embodiment, the rectifier circuit 81 includes the inductor L1 and the diode bridge DB, and the voltage signal Vac supplied between the wire W1 and the wire W2 is input to the circuit. The rectifier circuit 81 outputs a signal obtained by full-wave rectification of the voltage signal Vac by the diode bridge DB to the wire W4 as the rectified voltage signal WR.

The heater drive circuit 82*a* includes capacitors Cla and C2*a*, a diode D1*a*, an inductor L2*a*, and a switch circuit SWa.

The capacitor Cla has one end electrically coupled to the wire W4 and the other end electrically coupled to a wire W6*a*. The diode D1*a* has a cathode terminal electrically coupled to the wire W4 and an anode terminal electrically coupled to a wire W7*a*. The inductor L2*a* has one end electrically coupled to the wire W4 and the other end electrically coupled to a wire W8*a*. The capacitor C2*a* has one end electrically coupled to the wire W8*a* and the other end electrically coupled to the wire W7*a*. The switch circuit SWa has one end electrically coupled to the wire W7*a* and the other end electrically coupled to the wire W6*a*. A drive control signal Dra output by the heater control circuit 83 is input to a control terminal of the switch circuit SWa.

In other words, the one end of the capacitor Cla, the cathode terminal of the diode D1*a*, and the one end of the inductor L2*a* are electrically coupled to the wire W4, the other end of the capacitor Cla and the other end of the switch circuit SWa are electrically coupled to the wire W6*a*, the anode terminal of the diode D1*a*, the one end of the capacitor C2*a*, and the one end of the switch circuit SWa are electrically coupled to the wire W7*a*, and the other end of the inductor L2*a* and the one end of the capacitor C2*a* are electrically coupled to the wire W8*a*. The wire W8*a* is electrically coupled to one end of the heater 90*a*, and the wire W7*a* is electrically coupled to the other end of the heater 90*a*. That is, the heater drive circuit 82*a* outputs a voltage generated between the wire W8*a* and the wire W7*a* as the heater drive signal HCa.

The heater drive circuit 82*a* includes a current detection circuit 821*a* and a voltage detection circuit 822*a*.

The current detection circuit 821*a* has one end electrically coupled to the wire W6*a* and the other end electrically coupled to the wire W5. The current detection circuit 821*a* detects a current value of a current that accompanies the propagation of the heater drive signal HCa and accompanies the propagation of the rectified voltage signal WR. The current detection circuit 821*a* generates a current detection signal Idta corresponding to the detected current value and outputs the signal to the heater control circuit 83 as a state detection signal Dta.

The voltage detection circuit 822*a* has one end electrically coupled to the wire W8*a* and the other end electrically coupled to the wire W7*a*. The voltage detection circuit 822*a* detects a voltage value of the heater drive signal HCa supplied to the heater 90*a*. The voltage detection circuit 822*a* generates a voltage detection signal Vdta corresponding to the detected voltage value, and outputs the signal as a state detection signal Dta to the heater control circuit 83.

In the heater drive circuit 82*a* having the above described configuration, the capacitors Cla and C2*a*, the diode D1*a*, the inductor L2*a*, the switch circuit SWa, the current detection circuit 821*a*, and the voltage detection circuit 822*a* correspond to the capacitors C1 and C2, the diode D1, the inductor L2, the switch circuit SW, the current detection circuit 821, and the voltage detection circuit 822 of the first embodiment, respectively, and perform similar operations.

The heater drive circuit 82*b* includes capacitors Clb and C2*b*, a diode Dlb, an inductor L2*b*, and a switch circuit SWb.

The capacitor Clb has one end electrically coupled to the wire W4 and the other end electrically coupled to a wire W6*b*. The diode Dlb has a cathode terminal electrically coupled to the wire W4 and an anode terminal electrically coupled to a wire W7*b*. The inductor L2*b* has one end electrically coupled to the wire W4 and the other end electrically coupled to a wire W8*b*. The capacitor C2*b* has one end electrically coupled to the wire W8*b* and the other end electrically coupled to the wire W7*b*. The switch circuit SWb has one end electrically coupled to the wire W7*b* and the other end electrically coupled to the wire W6*b*. A drive control signal Drb output by the heater control circuit 83 is input to a control terminal of the switch circuit SWb.

In other words, the one end of the capacitor Clb, the cathode terminal of the diode Dlb, and the one end of the inductor L2*b* are electrically coupled to the wire W4, the other end of the capacitor Clb and the other end of the switch circuit SWb are electrically coupled to the wire W6*b*, the anode terminal of the diode Dlb, the one end of the capacitor C2*b*, and the one end of the switch circuit SWb are electrically coupled to the wire W7*b*, and the other end of the inductor L2*b* and the one end of the capacitor C2*b* are electrically coupled to the wire W8*b*. The wire W8*b* is electrically coupled to one end of the heater 90*b*, and the wire W7*b* is electrically coupled to the other end of the heater 90*b*. That is, the heater drive circuit 82*b* outputs a voltage generated between the wire W8*b* and the wire W7*b* as the heater drive signal HCb.

The heater drive circuit 82*b* includes a current detection circuit 821*b* and a voltage detection circuit 822*b*.

The current detection circuit 821*b* has one end electrically coupled to the wire W6*b* and the other end electrically coupled to the wire W5. The current detection circuit 821*b* detects a current value of a current that accompanies the propagation of the heater drive signal HCb and accompanies the propagation of the rectified voltage signal WR. The current detection circuit 821*b* generates a current detection signal Idtb corresponding to the detected current value, and outputs the signal to the heater control circuit 83 as a state detection signal Dtb.

The voltage detection circuit 822*b* has one end electrically coupled to the wire W8*b* and the other end electrically coupled to the wire W7*b*. The voltage detection circuit 822*b* detects a voltage value of the heater drive signal HCb supplied to the heater 90*b*. The voltage detection circuit 822*b* generates a voltage detection signal Vdtb corresponding to the detected voltage value, and outputs the signal as a state detection signal Dtb to the heater control circuit 83.

In the heater drive circuit 82*b* having the above described configuration, the capacitors Clb and C2*b*, the diode Dlb, the inductor L2*b*, the switch circuit SWb, the current detection circuit 821*b*, and the voltage detection circuit 822*b* correspond to the capacitors C1 and C2, the diode D1, the inductor L2, the switch circuit SW, the current detection circuit 821, and the voltage detection circuit 822 of the first embodiment, respectively, and perform similar operations.

The heater control circuit 83 generates the drive control signal Dra based on the current detection signal Idta input from the current detection circuit 821*a* and the voltage detection signal Vdta input from the voltage detection circuit 822*a*, and outputs the drive control signal to the switch circuit SWa. The heater control circuit 83 generates the drive control signal Drb based on the current detection signal Idtb input from the current detection circuit 821*b* and the voltage detection signal Vdtb input from the voltage detection circuit 822*b*, and outputs the drive control signal to the switch circuit SWb.

The heater unit 2 of the second embodiment having the above described configuration also exerts the same functions and effects as those of the heater unit 2 of the first embodiment.

In the heater unit 2 of the second embodiment, the heater control circuit 83 outputs the drive control signal Dra and the drive control signal Drb at different frequencies. That is, in the heater unit 2 of the second embodiment, the one end and the other end of the switch circuit SWa repeat being continuous and being discontinuous in a switching cycle Fsw1 defined by the frequency of the drive control signal Dra, and the one end and the other end of the switch circuit SWb repeat being continuous and being discontinuous in a switching cycle Fsw2 defined by the frequency of the drive control signal Drb. Here, the switching cycle Fsw1 and the switching cycle Fsw2 have different frequencies.

Accordingly, as in the heater unit 2 of the second embodiment, even when the heater unit 2 includes the heater drive circuit 82*a* that outputs the heater drive signal HCa to the heater 90*a* and the heater drive circuit 82*b* that outputs the heater drive signal HCb to the heater 90*b* as a plurality of the heater drive circuits 82, the chance that switching noise that may accompany the switching operation of the switch circuit SWa and switching noise that may accompany the switching operation of the switch circuit SWb interfere each other is reduced. As a result, even when the heater unit 2 includes the heater drive circuit 82*a* that outputs the heater drive signal HCa to the heater 90*a* and the heater drive circuit 82*b* that outputs the heater drive signal HCb to the heater 90*b* as a plurality of the heater drive circuits 82, the chance that the stability of the operation of the heater unit 2 becomes lower is reduced.

In the liquid ejection system PS of the second embodiment having the above described configuration, the heater unit 2 is an example of an optional unit for a liquid ejection apparatus, the voltage signal Vac is an example of a commercial power supply, the heater drive signal HCa is an example of a first drive power signal, the heater drive signal HCb is an example of a second drive power signal, the heater drive circuit 82*a* is an example of a first drive power output unit, the heater drive circuit 82*b* is an example of a second drive power output unit, the heater 90*a* is an example of a first drive unit, and the heater 90*b* is an example of a second drive unit. The capacitor Cla of the heater drive circuit 82*a* is an example of a first capacitor, the capacitor C2*a* is an example of a second capacitor, the inductor L2*a* is an example of a first inductor, the diode D1*a* is an example of a first diode, at least one of the switch circuit SWa and the transistor M1 contained in the switch circuit SWa is an example of a first switching element, the capacitor Clb of the heater drive circuit 82*b* is an example of a third capacitor, the capacitor C2*b* is an example of a fourth capacitor, the inductor L2*b* is an example of a second inductor, the diode Dlb is an example of a second diode, and at least one of the switch circuit SWb and the transistor M1 contained in the switch circuit SWb is an example of a third switching element. The wire W4 is an example of a first node and a fifth node, the wire W8*a* is an example of a second node, the wire W7*a* is an example of a third node, the wire W6*a* is an example of a fourth node, the wire W8*b* is an example of a sixth node, the wire W7*b* is an example of a seventh node, and the wire W6*b* is an example of an eighth node. The switching cycle Fsw1 is an example of a first switching cycle, and the switching cycle Fsw2 is an example of a second switching cycle.

Although the embodiments and the modified examples are described above, the present disclosure is not limited to the embodiments and can be implemented in various aspects without departing from the gist thereof. For example, the above described embodiments can be appropriately combined.

The present disclosure includes substantially the same configurations as the configurations described in the embodiments, for example, configurations having the same functions, methods, and results and configurations having the same purposes and effects. Further, the present disclosure includes configurations in which non-essential portions of the configurations described in the embodiments are replaced. Furthermore, the present disclosure includes configurations that may exert the same functions and effects or configurations that may achieve the same purposes as those of the configurations described in the embodiments. In addition, the present disclosure includes configurations obtained by addition of known techniques to the configurations described in the embodiments.

The following configurations are derived from the above described embodiments.

An optional unit for a liquid ejection apparatus according to an aspect of the present disclosure is an optional unit for a liquid ejection apparatus attached to a liquid ejection apparatus for use, including a rectifier circuit to which a commercial power supply is input and which outputs a rectified voltage signal, a first drive power output circuit to which the rectified voltage signal is input and which outputs a first drive power signal, and a first drive unit which is driven by the first drive power signal, wherein the first drive power output circuit includes a first capacitor, a second capacitor, a first inductor, a first diode, and a first switching element, one end of the first capacitor, a cathode terminal of the first diode, and one end of the first inductor are electrically coupled to a first node, the other end of the first inductor and one end of the second capacitor are electrically coupled to a second node, the other end of the second capacitor, an anode terminal of the first diode, and one end of the first switching element are electrically coupled to a third node, the other end of the first capacitor and the other end of the first switching element are electrically coupled to a fourth node, the rectified voltage signal is supplied to the first node, and the first drive unit has one end electrically coupled to the second node and the other end electrically coupled to the third node.

According to the optional unit for a liquid ejection apparatus, the voltage value of the first drive power signal may be controlled by the operation of the first switching element regardless of the voltage value of the input commercial power supply. Accordingly, even when the optional unit for a liquid ejection apparatus is used in a region where the power supply environment including the voltage value of the commercial power supply is different and the voltage value of the commercial power supply is changed, the chance that the change affects the operation of the first drive unit as the load is reduced. As a result, the chance that the stability of the operation of the optional unit for a liquid ejection apparatus becomes lower is reduced.

In the aspect of the optional unit for a liquid ejection apparatus, the first drive power output circuit may include a second switching element, one end of the second switching element may be electrically coupled to the third node, and the other end of the second switching element may be electrically coupled to the fourth node.

According to the optional unit for a liquid ejection apparatus, the second switching element is provided in parallel with the first switching element, and thereby, losses that accompany the propagation of the first drive power signal in the first switching element and the second switching element may be reduced.

In the aspect of the optional unit for a liquid ejection apparatus, the one end and the other end of the second switching element may be controlled to be discontinuous in a period in which the one end and the other end of the first switching element are controlled to be continuous, and the one end and the other end of the first switching element may be controlled to be discontinuous in a period in which the one end and the other end of the second switching element are controlled to be continuous.

According to the optional unit for a liquid ejection apparatus, the second switching element is provided in parallel with the first switching element and the first switching element and the second switching element alternately execute the switching operation, and thereby, the switching losses in the first switching element and the second switching element may be reduced.

In the aspect of the optional unit for a liquid ejection apparatus, a second drive power output circuit to which the rectified voltage signal is input and which outputs a second drive power signal, and a second drive unit which is driven by the second drive power signal are provided. The second drive power output circuit may have a third capacitor, a fourth capacitor, a second inductor, a second diode, and a third switching element, one end of the third capacitor, a cathode terminal of the second diode, and one end of the second inductor may be electrically coupled to a fifth node, the other end of the second inductor and one end of the fourth capacitor may be electrically coupled to a sixth node, and the other end of the fourth capacitor, an anode terminal of the second diode, one end of the third switching element may be electrically coupled to a seventh node, the other end of the third capacitor and the other end of the third switching element may be electrically coupled to an eighth node, the rectified voltage signal may be supplied to the fifth node, and the second drive unit may have one end electrically coupled to the sixth node and the other end electrically coupled to the seventh node.

According to the optional unit for a liquid ejection apparatus, even when the second drive power output circuit is provided in addition to the first drive power output circuit, the voltage values of the first drive power signal and the second drive power signal may be controlled by the operations of the first switching element and the third switching element regardless of the voltage value of the input commercial power supply. Accordingly, even when the optional unit for a liquid ejection apparatus is used in a region where the power supply environment including the voltage value of the commercial power supply is different and the voltage value of the commercial power supply is changed, the chance that the change affects the operations of the first drive unit and the second drive unit as the loads is reduced. As a result, the chance that the stability of the operation of the optional unit for a liquid ejection apparatus becomes lower is reduced.

In the optional unit for a liquid ejection apparatus, the one end and the other end of the first switching element may repeat being continuous and being discontinuous in a first switching cycle, the one end and the other end of the third switching element may repeat being continuous and being discontinuous in a second switching cycle, and a frequency of the first switching cycle and a frequency of the second switching cycle may be different.

According to the optional unit for a liquid ejection apparatus, the switching frequency of the first switching element contained in the first drive power output circuit and the switching frequency of the third switching element contained in the second drive power output circuit are different from each other, and thereby, the chance that switching noise that accompanies switching of the first switching element and switching noise that accompanies switching of the third switching element interfere with each other is reduced. As a result, the chance that the stability of the operation of the optional unit for a liquid ejection apparatus becomes lower is further reduced.

In the aspect of the optional unit for a liquid ejection apparatus, the first drive unit may be a heater.

What is claimed is:

1. An optional unit for a liquid ejection apparatus attached to a liquid ejection apparatus for use, comprising:

a rectifier circuit to which a commercial power supply is input and which outputs a rectified voltage signal:

a first drive power output circuit to which the rectified voltage signal is input and which outputs a first drive power signal; and a first drive unit which is driven by the first drive power signal, wherein the first drive power output circuit includes a first capacitor, a second capacitor, a first inductor, a first diode, a first switching element, and a second switching element, one end of the first capacitor, a cathode terminal of the first diode, and one end of the first inductor are electrically coupled to a first node, the other end of the first inductor and one end of the second capacitor are electrically coupled to a second node, the other end of the second capacitor, an anode terminal of the first diode, one end of the first switching element, and one end of the second switching element are electrically coupled to a third node, the other end of the first capacitor, the other end of the first switching element, and the other end of the second switching element are electrically coupled to a fourth node, the rectified voltage signal is supplied to the first node, the first drive unit has one end electrically coupled to the second node and the other end electrically coupled to the third node, the one end and the other end of the second switching element are controlled to be discontinuous in a period in which the one end and the other end of the first switching element are controlled to be continuous, and the one end and the other end of the first switching element are controlled to be discontinuous in a period in which the one end and the other end of the second switching element are controlled to be continuous.

2. The optional unit for a liquid ejection apparatus according to claim 1, further comprising:

a second drive power output circuit to which the rectified voltage signal is input and which outputs a second drive power signal; and a second drive unit which is driven by the second drive power signal, wherein the second drive power output circuit includes a third capacitor, a fourth capacitor, a second inductor, a second diode, and a third switching element, one end of the third capacitor, a cathode terminal of the second diode, and one end of the second inductor are electrically coupled to a fifth node, the other end of the second inductor and one end of the fourth capacitor are electrically coupled to a sixth node, the other end of the fourth capacitor, an anode terminal of the second diode, and one end of the third switching element are electrically coupled to a seventh node, the other end of the third capacitor and the other end of the third switching element are electrically coupled to an eighth node, the rectified voltage signal is supplied to the fifth node, and the second drive unit has one end electrically coupled to the sixth node and the other end electrically coupled to the seventh node.

3. The optional unit for a liquid ejection apparatus according to claim 2, wherein the one end and the other end of the first switching element repeat being continuous and being discontinuous in a first switching cycle, the one end and the other end of the third switching element repeat being continuous and being discontinuous in a second switching cycle, and a frequency of the first switching cycle and a frequency of the second switching cycle are different.

4. The optional unit for a liquid ejection apparatus according to claim 1, wherein the first drive unit is a heater.

* * * * *